(12) United States Patent
Seong

(10) Patent No.: US 7,206,266 B2
(45) Date of Patent: Apr. 17, 2007

(54) OPTICAL PICKUP, OPTICAL RECORDING AND/OR REPRODUCING APPARATUS INCLUDING THE SAME, AND METHOD FOR REALIZING COMPATIBLE TRACKING

(75) Inventor: Pyong-yong Seong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 549 days.

(21) Appl. No.: 10/822,868

(22) Filed: Apr. 13, 2004

(65) Prior Publication Data

US 2004/0246834 A1  Dec. 9, 2004

(30) Foreign Application Priority Data

Apr. 14, 2003  (KR) ...................... 10-2003-0023350

(51) Int. Cl.
*G11B 7/00* (2006.01)
(52) U.S. Cl. ................................. 369/44.41; 369/44.27
(58) Field of Classification Search ............. 369/44.41, 369/44.42, 44.26, 44.27, 44.28, 44.29, 44.32
See application file for complete search history.

(56) References Cited

U.S. PATENT DOCUMENTS 7,116,612 B2 * 10/2006 Ogasawara et al. ...... 369/44.37

FOREIGN PATENT DOCUMENTS

| JP | 08-221774 | 8/1996 |
|---|---|---|
| JP | 10-83546 | 3/1998 |
| JP | 2002-197688 | 7/2002 |
| KR | 1999-20821 | 6/1999 |
| KR | 2001-86330 | 9/2001 |
| KR | 2001 86330 | 9/2001 |
| KR | 2002-123966 | 4/2002 |

OTHER PUBLICATIONS

Notice of Office Action issued by the Korean Patent Office on Mar. 29, 2005 in Application No. 10-2003-0011635.

* cited by examiner

*Primary Examiner*—Nabil Hindi
(74) *Attorney, Agent, or Firm*—Staas & Halsey LLP

(57) ABSTRACT

An optical pickup, optical recording and/or reproducing apparatus including the same, and a method of realizing a tracking servo that is compatible between different types of optical data storage media. The optical recording and/or reproducing apparatus splits light from a light source into a main beam and four or more sub beams symmetrical with respect to the main beam, which are then emitted on an optical data storage medium, wherein the four or more sub beams include two first sub beams located close to the main beam and two second sub beams located away from the main beam, and detects a tracking error signal by a differential push-pull (DPP) method using detection signals of the main beam and the pair of first sub beams and of the main beam and the pair of second sub beams for ±R/RW and RAM type optical data storage media, respectively. The optical pickup and optical recording and/or reproducing apparatus makes it possible to realize a tracking servo that is compatible between ±R/RW and RAM type optical data storage media having different track pitch dimensions based on DPP.

33 Claims, 7 Drawing Sheets

OPTICAL PICKUP, OPTICAL RECORDING AND/OR REPRODUCING APPARATUS INCLUDING THE SAME, AND METHOD FOR REALIZING COMPATIBLE TRACKING

CROSS-REFERENCE TO RELATED APPLICATIONS

This application claims the priority of Korean Patent Application No. 2003-23350, filed on Apr. 14, 2003, in the Korean Intellectual Property Office, the disclosure of which is incorporated herein in its entirety by reference.

BACKGROUND OF THE INVENTION

1. Field of the Invention

The present invention relates to an optical pickup and optical recording and/or reproducing apparatus designed to optimally realize a tracking servo for various kinds of optical discs by allowing compatibility between the discs, and a method of realizing compatible tracking.

2. Description of the Related Art

In general, a differential push-pull (DPP) method exhibiting excellent shift characteristics of an objective lens is mostly used in tracking of an optical pickup for recording. The DPP method uses zero-order and plus and minus first-order beams diffracted by a grating where a phase difference between plus and minus first-order diffracted beams illuminated on an optical disc is 180°.

FIG. 1 schematically shows the configuration of a photodetector 10 used in an optical pickup designed to realize a tracking servo using a DPP method. The photodetector 10 having eight sections is comprised of a main photodetector 11 divided into four sections A, B, C, and D and a pair of sub photodetectors 13 and 15, each being divided into two sections I1 and I2, and J1 and J2, respectively. While a zero-order beam diffracted by a grating is received by the main photodetector 11, plus and minus first-order diffracted beams are received by the sub photodetectors 13 and 15, respectively.

In this case, a tracking error signal is detected by a DPP method by taking the difference between the sum of detection signals from sections I1 and J1 of sub photodetectors 13 and 15 and the sum of detection signals from the remaining sections I2 and J2.

There is no problem with implementing a tracking servo for either DVD±R/RW or DVD-RAM using a typical DPP method. However, where an optical pickup designed to realize a tracking servo by DPP is employed for DVD±R/RW and DVD-RAM, the tracking servo is impossible to properly implement since the track pitch difference between the DVD±R/RW and DVD-RAM results in an extremely large phase difference between the plus and minus first-order beams.

Thus, if a phase is precisely fitted with respect to either DVD±R/RW or DVD-RAM, then the first-order beams are completely out of phase with respect to the other, which makes tracking impossible to implement. Furthermore, as evident from a graph of FIG. 6 that will be described later, if a phase is adjusted so that it is fitted about in the middle between DVD±R/RW and DVD-RAM discs, minimum phase differences with respect to DVD±R/RW and DVD-RAM discs deviate from the reference by greater than about 45°. Thus, it is also impossible to realize tracking since the phase difference is extremely large or small.

SUMMARY OF THE INVENTION

The present invention provides an optical pickup and optical recording and/or reproducing apparatus designed to realize a tracking servo for different optical data storage media having different track pitch dimensions using a differential push-pull (DPP) method, and a compatible tracking realization method.

According to an aspect of the present invention, there is provided an optical pickup including at least one light source; at least one light splitting device, which splits light from the light source into a main beam and four or more sub beams symmetrical with respect to the main beam, which are then emitted on an optical data storage medium, wherein the four or more sub beams include two first sub beams located close to the main beam and two second sub beams located away from the main beam; and at least one photodetecting device, which receives the main and sub beams reflected off the optical data storage medium. Where phase differences between the pair of first sub beams and between the pair of second sub beams are PH1 and PH2, respectively, the first and second sub beams are emitted on the optical data storage medium so that PH1 and/or PH2 satisfy Equations (1) and/or (2) given below, respectively, and a tracking error signal is detectable by a differential push-pull (DPP) method using the main beam and the pair of first sub beams and the main beam and the pair of second sub beams for ±R/RW and RAM type optical data storage media, respectively:

$$181.5° \leq PH1 \leq 211.5° \quad (1)$$

$$148.3° \leq PH2 \leq 181.7° \quad (2)$$

Here, the photodetecting device may include a main photodetector receiving the main beam, a pair of first sub photodetectors receiving the first sub beams, and a pair of second sub photodetectors receiving the second sub beams.

Each of the first and second sub photodetectors may be divided into two or more sections, and the main photodetector may be divided into four or more sections. Either second sub photodetector may be divided into four or more sections. The light splitting device is a diffractive optical element that diffracts the light from the light source into a plurality of beams including zero-order beam and plus and minus first- and second-order beams, and the main beam, the pair of first sub beams, and the pair of second sub beams are the zero-order beam, the plus and minus first-order beams, and the plus and minus second-order beams, respectively.

The optical pickup according to the invention may be constructed to record and/or reproduce a plurality of different types of optical data storage media that are compatible with one another by using beams having a plurality of different wavelengths. The optical pickup may also be constructed to record and/or reproduce at least some of CD-ROM/R/RW and at least some of DVD-ROM/±R/RW/RAM that are compatible with one another. The optical pickup may also be constructed to record and/or reproduce at least some of DVD-ROM/±R/RW/RAM and/or at least some of CD-ROM/R/RW. In this case, the RAM type optical data storage medium is DVD-RAM optical data storage medium, and the ±R/RW type optical data storage medium is DVD±R/RW and/or CD-R/RW optical data storage medium.

Additional aspects and/or advantages of the invention will be set forth in part in the description which follows and, in part, will be obvious from the description, or may be learned by practice of the invention.

According to another aspect of the present invention, there is provided an optical recording and/or reproducing apparatus including an optical pickup including at least one light splitting device, which splits light from at least one light source into a main beam and four or more sub beams symmetrical with respect to the main beam, which are then emitted on an optical data storage medium, wherein the four or more sub beams include first two sub beams located close to the main beam and second two sub beams located away from the main beam, at least one photodetecting device, which receives the main and sub beams reflected off the optical data storage medium, and where phase differences between the pair of first sub beams and between the pair of second sub beams are PH1 and/or PH2, respectively, the first and second sub beams are emitted on the optical data storage medium so that PH1 and PH2 satisfy Equations (1) and (2) given above, respectively, and a tracking error signal can be detected by a differential push-pull (DPP) method using the main beam and the pair of first sub beams and the main beam and the pair of second sub beams for ±R/RW and RAM type optical data storage media, respectively; and a signal processor designed to detect a tracking error signal by differential push-pull (DPP) using detection signals of the main and first sub beams and of the main and second sub beams for ±R/RW and RAM type optical data storage media, respectively.

The signal processor detects a focus error signal by a differential astigmatic method using detection signals from the main and second sub photodetectors for a RAM type optical data storage medium.

According to another aspect of the present invention, there is provided a method of realizing a tracking servo, which is compatible between different types of optical data storage media, splitting light from a light source into a main beam and four or more sub beams symmetrical with respect to the main beam, wherein the four or more sub beams include first two sub beams located close to the main beam and second two sub beams located away from the main beam, and where phase differences between the pair of first sub beams and/or between the pair of second sub beams are PH1 and/or PH2, respectively, emitting the first and second sub beams on an optical data storage medium in such a manner that PH1 and/or PH2 satisfy Equations (1) and/or (2) given above, respectively; detecting the main and sub beams reflected off the optical data storage medium; and detecting a tracking error signal by differential push-pull (DPP) using detection signals resulting from the main and first sub beams and from the main and second sub beams for ±R/RW and RAM type optical data storage media, respectively.

Here, the detection of the tracking error signal may include determining whether detection signals of the main and first sub beams or the main and second sub beams will be used for detecting the tracking error signal according to an optical data storage medium type signal detected by an optical recording and/or reproducing apparatus; and detecting a tracking error signal suitable for the type of optical data storage medium by DPP and outputting the same.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
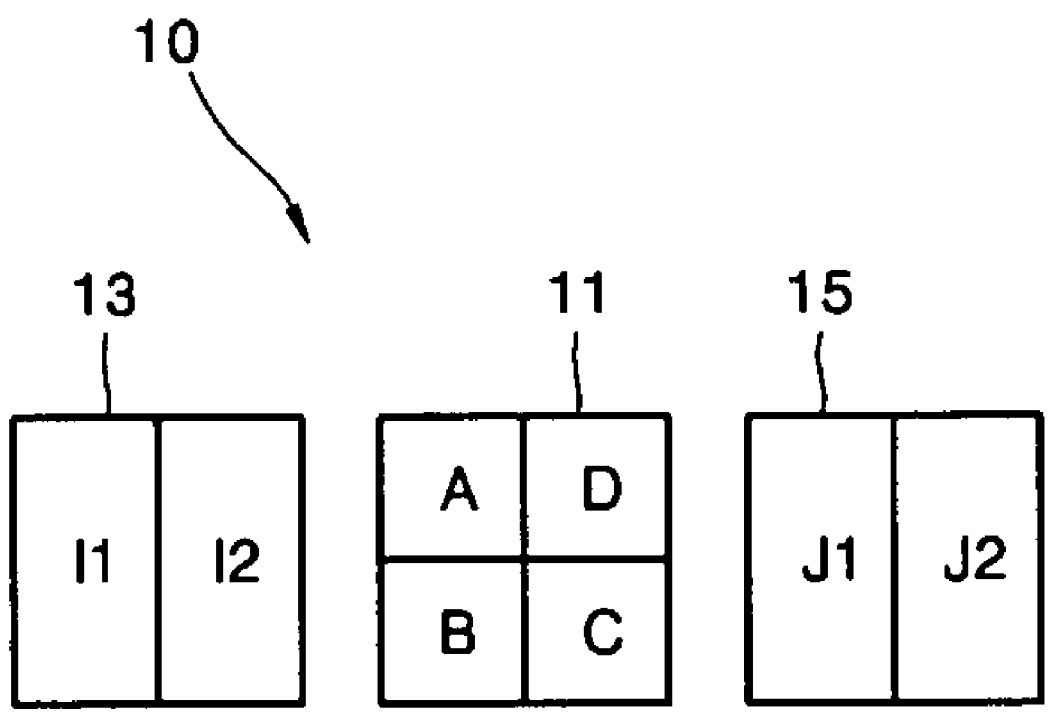
FIG. 1 is a top view of a photodetecting device divided into eight sections and adopted in a conventional recording and/or reproducing apparatus.

Reference will now be made in detail to the embodiments of the present invention, examples of which are illustrated in the accompanying drawings, wherein like reference numerals refer to the like elements throughout. The embodiments are described below to explain the present invention by referring to the figures.

It is an aspect of the present invention to realize a tracking servo based on a differential push-pull (DPP) method by selection of appropriate photodetected signals for ±R/RW and RAM discs being inserted using five beams as well as the fact that all optical recording and/or reproducing apparatuses are constructed to determine the type of an optical disc being inserted. This invention can realize a tracking servo that is compatible between ±R/RW and RAM optical discs.

Thus, by employing a technique according to the invention, for example, an optical pickup for DVD-multi recording, an optical recording and/or reproducing apparatus including the same can be realized. In this case, the optical pickup and optical recording and/or reproducing apparatus including the same according to the invention can record and/or reproduce a variety of formats such as, DVD-ROM, DVD±R, DVD±RW, and DVD-RAM and additionally at least some of CD-ROM, CD-R, and CD-RW.

Figure 2:
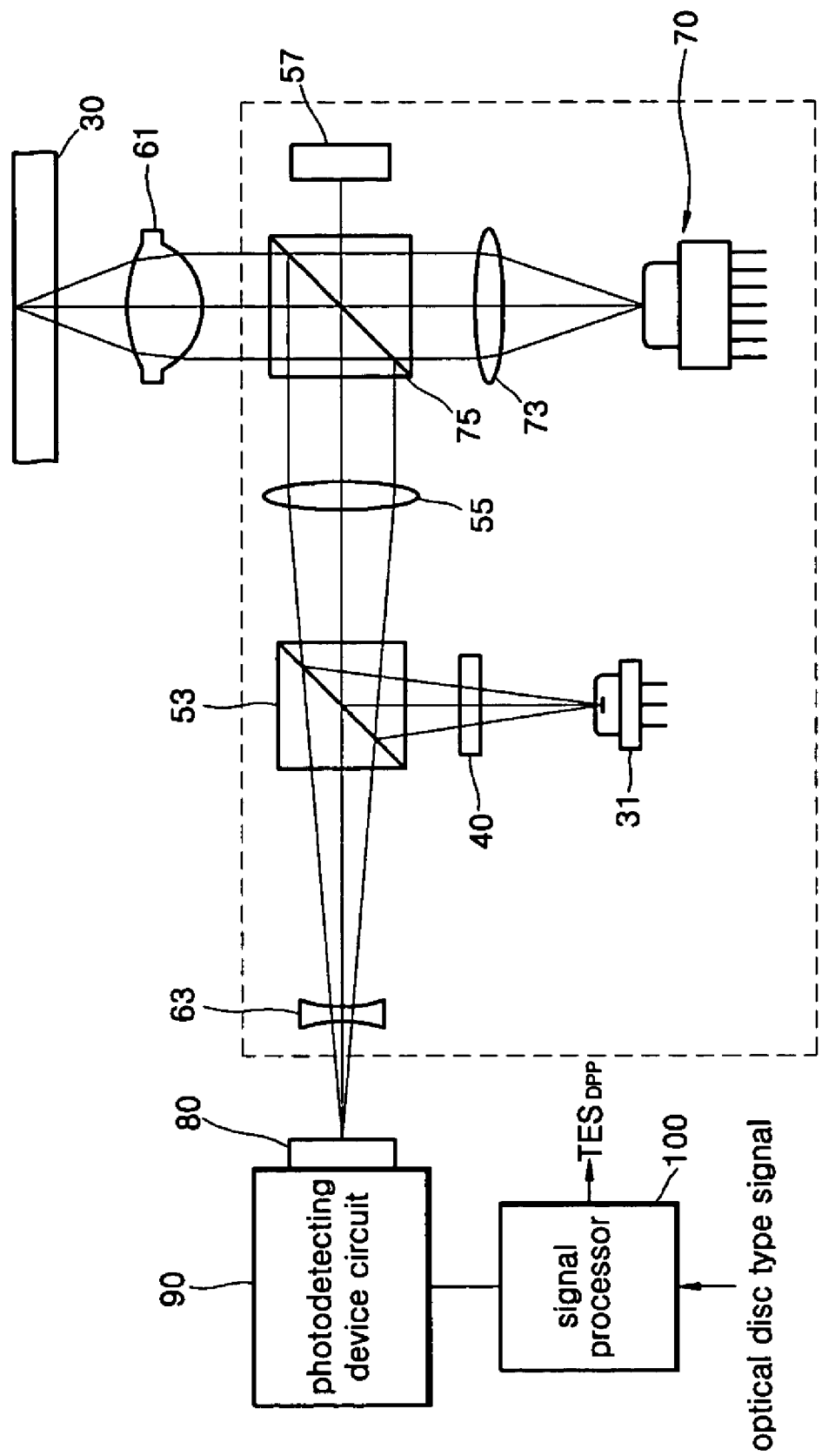
FIG. 2 schematically shows the optical configuration of an optical pickup according to an embodiment of the invention and an optical recording and/or reproducing apparatus including the same.

Referring to FIG. 2, an optical recording and/or reproducing apparatus according to an embodiment of the invention includes an optical pickup that emits a main beam and four sub beams that are symmetrical with respect to the main beam on a main track of an optical disc 30 and receives the main and sub beams reflected off the optical disc 30 for detection, and a signal processor 100 that uses detection signals of the main and sub beams in order to detect a tracking error signal by DPP.

The optical pickup splits light from a light source 31 into the main beam and four or more sub beams symmetrical with respect to the main beam. Where two of the four sub beams located close to the main beam are first sub beams and the remaining two located away from the main beam are second sub beams, the optical pickup is constructed to detect tracking error signals by a DPP method using the main beam and the first or second sub beams and the main beam and the second sub beam, respectively.

To achieve these and/or other aspects, the optical pickup is comprised of the light source 31, a light splitting device 40 that splits the light from the light source 31 into a main beam and four or more beams symmetrical with respect to the main beam, an optical system that guides the beams split by the light splitting device 40 that is a diffraction optical element to the optical disc 30, and a photodetecting device 80 that receives the main and sub beams reflected from the optical disc 30. FIG. 2 shows an example in which the optical pickup according to the invention further includes a hologram optical module 70 to allow compatibility between a plurality of formats using different wavelength light, for example, between both CDs and DVDs. The optical pickup according to the invention having the optical configuration as shown in FIG. 2 is able to record and/or reproduce DVD-ROM/±RW/RAM as well as CD-ROM/R/RW.

A diffraction optical element such as a grating or hologram optical element is used as the light splitting device 40 to split the light incident from the light source 31 into five or more beams by diffracting the same into zero-order, plus and minus first-orders, and plus and minus second orders, for example.

Figure 3:
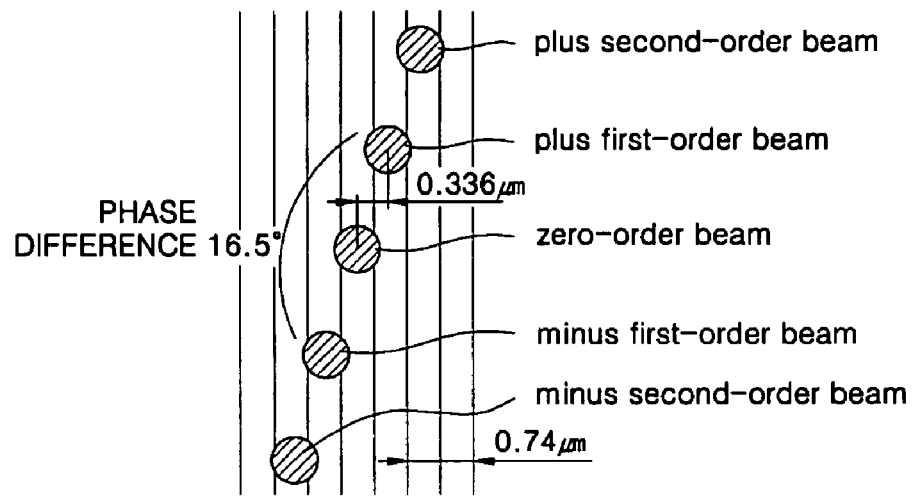
FIG. 3 shows zero-order, plus and minus first-order, and plus and minus second-order beams split by the light splitting device shown in FIG. 2 and radiated on DVD±R/RW.
Figure 4:
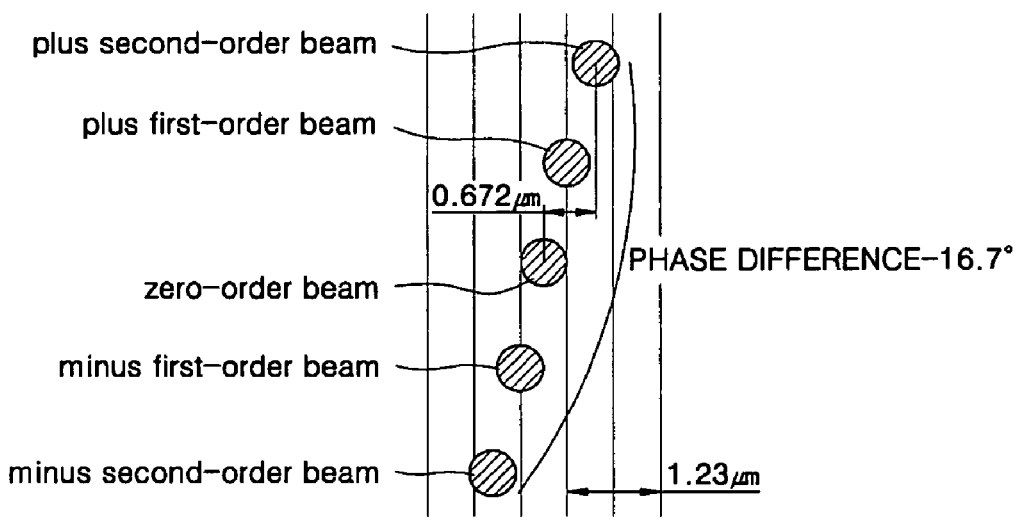
FIG. 4 shows zero-order, plus and minus first-order, and plus and minus second-order beams split by the light splitting device shown in FIG. 2 and radiated on DVD-RAM.

In the case where the diffractive optical element is used as the light splitting device 40, as shown in FIGS. 3 and 4, the zero-order, plus and minus first-order, and plus and minus second order beams correspond to the main beam, first sub beams, and second sub beams, respectively. Hereinafter, for convenience of explanation and understanding, the main beam, first sub beams, and second sub beams are represented by the zero-order, plus and minus first-order, and plus and minus second-order beams, respectively.

FIGS. 3 and 4 show the zero-order, plus and minus first-order, and plus and minus second-order beams split by the light splitting device 40 and emitted on DVD±R/RW and DVD-RAM, respectively.

The optical pickup according to the invention is constructed such that spacings and phase differences between the plus and minus first-order beams and between the plus and minus second-order beams emitted on the optical disc 30 are obtained in such a way as to detect a tracking error signal by DPP for ±R/RW type discs such as DVD±R/RW discs using receiving signals of the zero-order and plus and minus first-order beams while detecting the same by DPP for RAM type discs such as DVD-RAM disc using receiving signals of the zero-order and plus and minus second-order beams. The phase between the plus and minus first-order (or second-order) beams is adjusted by rotating the light splitting device 40.

In the technical field of this invention, it is known that if a phase difference between two sub beams deviates from a reference value of 180° by less than about 40°, it is possible to implement a tracking servo using a DPP method. Here, the reference value of 180° is an optimal phase difference in detecting a tracking error signal by the DPP method.

Thus, the light splitting device 40 and the overall optical system of the optical pickup according to the invention are arranged so that when the beams split by the light splitting device 40 are emitted on the optical disc 30, the phase differences between the plus and minus first-order beams and between the plus and minus second-order beams are within the ranges of 16.5−15° to 16.5+15° and −16.7−15° to −16.7+15° with respect to the reference value of 180°, respectively.

That is, where the phase differences between the pair of first sub beams (plus and minus first-order beams) and between the pair of second sub beams (plus and minus second-order beams) are denoted by PH1 and PH2, respectively, the light splitting device 40 and the overall optical system of the optical pickup according to the invention are disposed so that PH1 and PH2 are within ranges that satisfy Equations (1) and (2) given below, respectively:

$$181.5° \leq PH1 \leq 211.5° \quad (1)$$

$$148.3° \leq PH2 \leq 181.7° \quad (2)$$

For example, as shown in FIG. 3, when the light splitting device 40 is rotated such that a distance between the zero-order beam and either of the plus and minus first-order beams, all of which are split by the light splitting device 40 and emitted on the DVD±R/RW disc having a track pitch of 0.74 μm, is for example, 0.336 μm, a phase difference between the plus and minus first-order beams on the DVD±R/RW disc deviates from the reference value of 180° by about 16.5°. In other words, the phase difference therebetween is about 196.5° at which it is highly possible to realize tracking by the DPP method.

Where the distance between the zero-order beam and either of the plus and minus first-order beams emitted on the DVD±R/RW disc is 0.336 μm as described above, a distance between the zero-order and either of the plus and minus second-order beams radiated on a DVD-RAM disc is 0.672 μm, which is double the distance of 0.336 μm.

Figure 5:
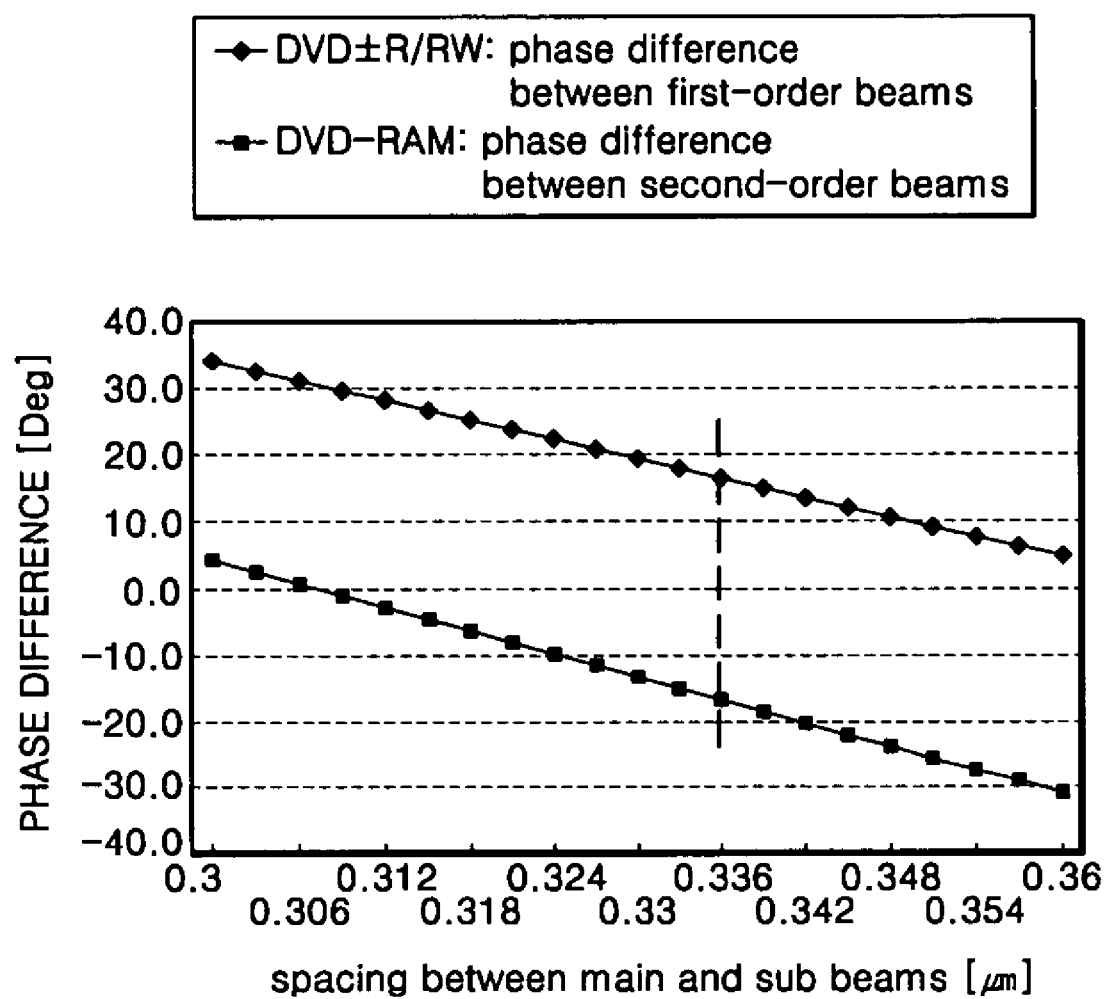
FIG. 5 is a graph showing changes in a phase difference between plus and minus first-order beams radiated on a DVD±R/RW disc and in a phase difference between plus and minus second-order beams radiated on a DVD-RAM disc with respect to a spacing between main and sub beams when employing an optical pickup according to the invention.

In this case, since a track pitch of the DVD-RAM disc is 1.23 μm, which is less than two times the track pitch of the DVD±R/RW disc, as shown in FIG. 4, the phase difference between the plus and minus second-order beams deviates from the reference value of 180° by about −16.7° as shown in FIG. 5. In other words, the phase difference therebetween is about 163.3° at which it is highly possible to realize tracking by the DPP method.

Figure 6:
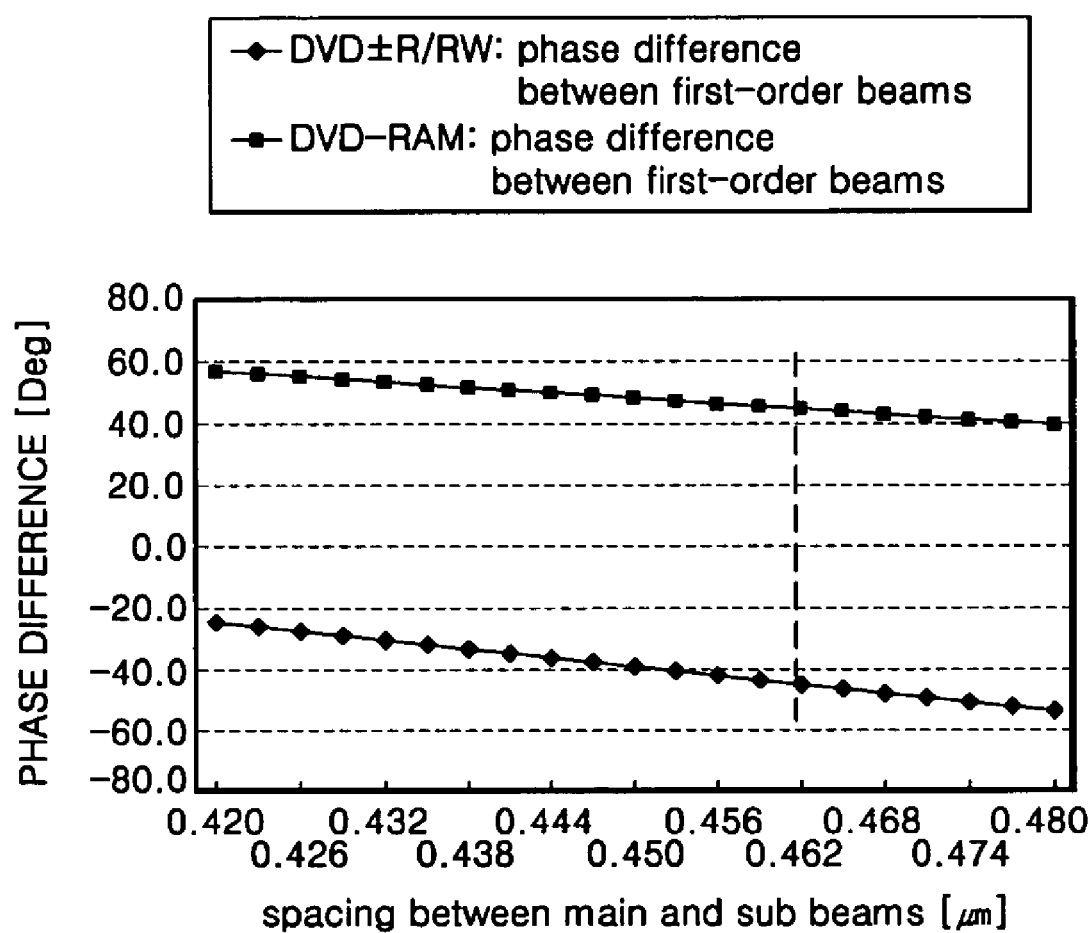
FIG. 6 is a graph showing changes in a phase difference between plus and minus first-order beams radiated on a DVD±R/RW disc and in a phase difference between plus and minus first-order beams radiated on a DVD-RAM disc when using conventional three-beams.

FIG. 5 is a graph showing changes in a phase difference between the plus and minus first-order beams radiated on the DVD±R/RW disc and in a phase difference between plus and minus second-order beams radiated on the DVD-RAM disc with respect to a spacing between main and sub beams when employing an optical pickup according to the invention. FIG. 6 is a graph showing changes in the phase difference between the plus and minus first-order beams radiated on DVD±R/RW disc and in the phase difference between the plus and minus first-order beams radiated on DVD-RAM disc when using a conventional three-beam method. In FIGS. 5 and 6, the axis of abscissa represents spacing (unit: micrometer) between the main beam and the sub beam while the axis of ordinates represents the difference from 180° that is the optimal value of a phase difference between two sub beams in realizing a tracking servo by DPP. The phase difference of 0° along the axis of ordinates means the reference value, that is, 180°.

As evident from FIG. 6, in the case of using the conventional three-beam method in which the distance between the plus and minus first-order beams is 0.462 μm so that the phase is fitted in the middle between DVD±R/RW and DVD-RAM discs, the phase differences between the two beams radiated on DVD±R/RW and DVD-RAM deviate from the reference value of 180° by greater than about 45°. Thus, it is almost impossible to implement tracking for DVD±R/RW and DVD-RAM.

Furthermore, if the distance between the plus and minus first-order beams is 0.42 μm so that the phase difference between the two beams emitted on the DVD±R/RW disc deviates from the reference value by −20°, the phase difference between the two beams radiated on the DVD-RAM disc differs from the reference value of 180° by more than 55°. Thus, tracking is possible to implement for DVD±R/RW, but not for DVD-RAM due to the extremely large difference from the reference value.

Conversely, if the phase difference between the plus and minus first-order beams emitted on the DVD-RAM disc is adjusted to realize tracking, the phase difference between the two beams radiated on DVD±R/RW deviates from the reference value of 180° to the extent that tracking is impossible to implement.

Thus, using the conventional three-beam method makes it impossible to realize a tracking servo for DVD±R/RW and DVD-RAM by DPP.

However, as evident from the graph of FIG. 5, when five beams are used as in the present invention, that is, the plus and minus first-order beams whose phase difference satisfies the range required by Equation (1) are used for DVD±R/RW, and the plus and minus second-order beams whose phase difference satisfies the range required by Equation (2) are used for DVD-RAM, both phase differences between the plus and minus first-order beams radiated on the DVD±R/RW disc and between the plus and minus second-order beams radiated on the DVD-RAM disc are in the range where tracking is possible to implement by DPP. Thus, it is possible to realize a tracking servo by DPP, which is compatible between both DVD±R/RW and DVD-RAM.

Furthermore, even in the case where the spacing between the plus and minus second-order beams is determined so that the phase difference between the plus and minus second order beams on the DVD-RAM disc is almost equal to the reference value, because the phase difference between the plus and minus first-order beams on the DVD±R/RW disc deviates from the reference value by about 35°, realizing a tracking servo by DPP is possible.

The closer the phase difference between the two beams, the better is the tracking performance by DPP.

As observed in FIG. 5, since the phase differences between the two beams used for DVD±R/RW and DVD-RAM discs differs from the reference value by less than 35°, this invention exhibits good tracking performance for the DVD±R/RW and DVD-RAM type discs by DPP.

As evident from the graph of FIG. 5, since phase differences between the plus and minus first-order beams and between the plus and minus second-order beams satisfy the ranges required by Equations (1) and (2), respectively, using the five split beams according to the invention makes it possible to realize a tracking servo compatible between ±R/RW and RAM type optical discs.

Here, FIGS. 3–6 show that this invention can realize tracking by DPP compatible between ±R/RW and RAM type optical discs, taking as an example the DVD±R/RW and DVD-RAM discs.

Considering the difference in track structure between ±R/RW and RAM type discs, a compatible tracking technology of this invention can be applied to current DVDs as well as optical discs of different formats such as next-generation DVDs such as next-generation DVD±RW and DVD-RAM. Here, ±R/RW means ±R and/or ±RW. Furthermore, a tracking servo can be realized by DPP for CD-R/RW by using detection signals of the plus and minus first- and second-order beams.

Figure 7:
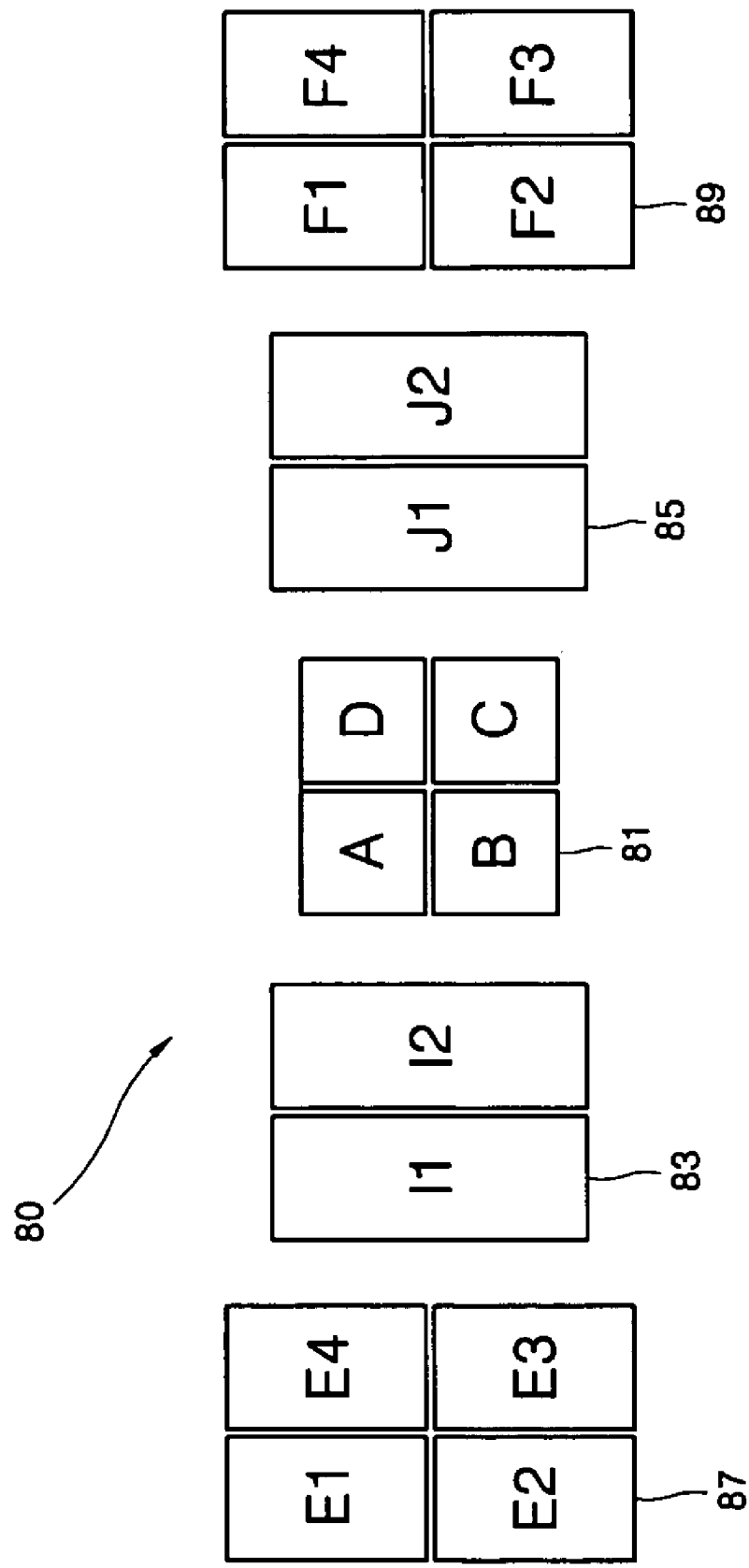
FIG. 7 is a top view schematically showing the partitional structure of a photodetecting device according to the invention.

Meanwhile, as shown in FIG. 7, the photodetecting device 80 of the optical pickup according to the invention is comprised of a main photodetector 81 for receiving the zero-order beam, a pair of first sub photodetectors 83 and 85 for receiving the plus and minus first-order beams, respectively, and a pair of second sub photodetectors 87 and 89 for receiving the plus and minus second-order beams, respectively, in such a way as to detect the zero-order beam and plus and minus first- and second-order beams for detection of a tracking error signal by DPP.

The main photodetector 81 is divided into two or more sections, for example, the main photodector is divided, into four sections to allow detection of a focus error signal by an astigmatic method. Each of the first sub photodetectors 83 and 85 is divided into two or more sections in such a way as to detect the plus and minus first-order beams for detection of a tracking error signal by DPP for ±R/RW type discs such as DVD±R/RW and/or CD-R/RW discs. Each of the second sub photodetectors 87 and 89 is divided into two or more sections in such a way as to detect the plus and minus second-order beams for detection of a tracking error signal by DPP for a RAM type disc such as a DVD-RAM disc. For example, as shown in FIG. 7, the second sub photodetectors 87 and 89 are divided into four sections to record and/or reproduce an optical disc, such as a DVD-RAM disc. If the second sub photodetectors 87 and 89 are divided into four sections in this way, it is possible to detect a focus error signal by a differential astigmatic method (DAM) when reproducing the DVD-RAM disc.

Where four sections of the main photodetectors 81 are A–D, two sections of first sub photodetector 83 are I1 and I2, two sections of the other first sub photodetector 85 are J1 and J2, four sections of one second sub photodetector 87 are E1–E4, four sections of the other second sub photodetector 89 are F1–F4, and detection signals generated from these sections are denoted by the same reference characters, tracking error signals $TES_{DPP \cdot R/RW}$ and $TES_{DPP \cdot RAM}$ detected by DPP for ±R/RW and RAM type discs, respectively, and a focus error signal d-FES detected by DAM are defined by Equations 3, 4, and 5 below, respectively:

$$TES_{DPP \cdot R/RW} = [(A+B)-(C+D)]-k1[(I1+J1)-(I2+J2)] \quad (3)$$

$$TES_{DPP \cdot RAM} = [(A+B)-(C+D)]-k2[\{(E1+F1)+(E2+F2)\}-\{(E3+F3)+(E4+F4)\}] \quad (4)$$

$$d\text{-}FES = [(A+C)-(B+D)]-k'[\{(E1+F1)+(E3+F3)\}-\{(E2+F2)+(E4+F4)\}] \quad (5)$$

where k1 and k2 are gains applied to detection signals from the first sub photodetectors 83 and 85 and the second sub photodetectors 87 and 89 so that optimal tracking error signals can be detected by the DPP for ±R/RW and RAM type discs, respectively, and k' is a gain applied to the second sub photodetectors 87 and 89 so that an optimal focus error signal can be detected by the DAM for a RAM type disc.

The reference characters of detection signals in Equations (3)–(5) denote current signals or current-to-voltage signals output from the sections of the main photodetector 81, the first sub photodetectors 83 and 85, and the second sub photodetectors 87 and 89.

Figure 8:
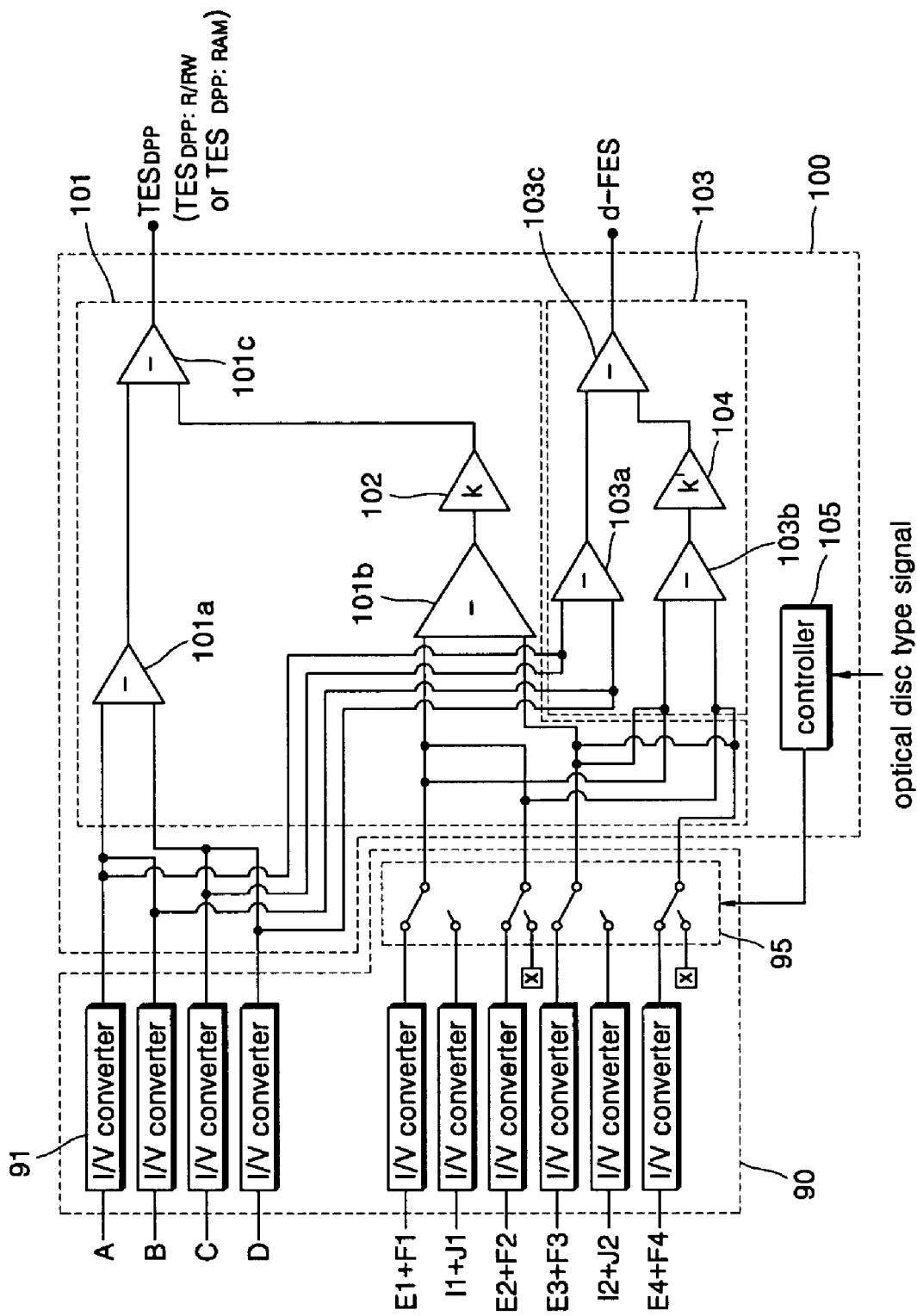
FIG. 8 is a block diagram schematically showing the photodetecting device circuit for converting current signals output from the main and sub photodetectors shown in FIG. 7 into voltage signals and signal processor according to an embodiment of the invention.

FIG. 8 is a block diagram schematically showing the photodetecting device circuit 90 of FIG. 2, which converts current signals output from the main and sub photodetectors 81, 83, 85, 87, and 89 into voltage signals and the signal processor 100 according to an embodiment of the invention. Referring to FIG. 8, a photodetecting device circuit 90 includes current-to-voltage (IN) converters 91 that convert current signals output from the main photodetector 81, the first sub photodetectors 83 and 85, and the second sub photodetectors 87 and 89 into voltage signals and outputs the resulting signals.

As shown in Equations (3)–(5), the detection signals from the sections I1 and J1, I2 and J2, E1 and F1, E2 and F2, E3 and F3, and E4 and F4 are summed, respectively, according to the DPP and/or the DAM.

Thus, as shown in FIG. 8, the photodetecting device circuit 90 is constructed such that the respective I/V converters 91 convert the respective sums of current signals output from the sections I1 and J1, I2 and J2, E1 and F1, E2 and F2, E3 and F3, and E4 and F4 into voltage signals.

Because the first sub photodetector 83 or 85 and the second sub photodetectors 87 and 89 can be selectively used depending on whether the type of an optical disc being subjected to the optical recording and/or reproducing apparatus according to an embodiment of this invention is ±R/RW, RAM or others, the photodetecting device circuit 90 further includes a switch 95 for selectively outputting the detection signals from the first sub photodetectors 83 and 85 and the second sub photodetectors 87 and 89.

The photodetecting device circuit 90 configured as shown in FIG. 8 has the advantage of reducing the number of its output terminal as much as possible.

The signal processor 100 includes a first detecting portion 101 that detects a tracking error signal by a DPP method. The signal processor 100 may further include a second detecting portion 103 that detects a focus error signal by the DAM.

Furthermore, the signal processor 100 further includes a controller 105 that controls the switch 95 of the photodetecting device circuit 90 in such a way as to detect a tracking error signal by the DPP selectively using the detection signals from the first sub photodetectors 83 and 85 or the second sub photodetectors 87 and 89. The controller 105 controls the switch 95 using an optical disc type signal detected by the optical recording and/or reproducing apparatus The first detecting portion 101 comprises first through third subtractors 101a–101c and a single gain adjuster 102. The first subtractor 101a receives detection signals output from the four sections A–D of the main photodetector 81 that receives a zero-order beam and the detection signals have been subjected to current-to-voltage conversion, and outputs a first push-pull signal (represented by MPP in Table 1 below). While the detection signals from the sections A and B of the main photodetector 81 placed in the tangential direction (hereinafter called 'T' direction) of the optical disc 30 are received by one input terminal of the first subtractor 101a, those from the remaining sections C and D are received by the other input terminal.

The second subtractor 101b receives detection signals output from the two sections I1 and J1 and the remaining two sections I2 and J2 of the first sub photodetectors 83 and 85 that receive the plus and minus first-order beams, respectively, and are subjected to current-to-voltage conversion or receives detection signals output from the four sections E1, E2, F1, and F2 and the remaining four sections E3, E4, F3, and F4 of the second sub photodetectors 87 and 89 that receive the plus and minus second-order beams, respectively, and subjected to current-to-voltage conversion. Upon receipt of those detection signals, the second subtractor 101b outputs a second push-pull signal (represented by SPP in Table 1 below).

For example, where a ±R/RW type disc is adopted, the detection signals from the sections I1 and J1 of the first sub photodetectors 83 and 85 placed in the T direction are received by one input terminal of the second subtractor 101b, those from the remaining sections I2 and J2 are received by the other input terminal. Where a RAM type disc is adopted, the detection signals from the sections E1, E2, F1, and F2 of the second sub photodetectors 87 and 89 are received by one input terminal of the second subtractor 101b, those from the remaining sections E3, E4, F3, and F4 are received by the other input terminal.

The second push-pull signal is amplified by a predetermined gain k in the gain adjuster 102. Here, the gain adjuster 102 adjusts the gain of the second push-pull signal in such a manner that a tracking error signal $TES_{DPP}$ detected by the DPP can be optimized. Furthermore, the gain of the second push-pull signal may vary depending on whether the type of disc being adopted is ±R/RW or RAM. The gain of the gain adjuster 102 may be controlled by the controller 105.

The third subtractor 101c receives the first and second push-pull signals, where the gain of the second push-pull signal has been adjusted, subtracts the received signals from each other, and outputs the tracking error signal $TES_{DPP}$ detected by the DPP. For example, in the case of adopting a ±R/RW type disc, the tracking error signal $TES_{DPP:R/RW}$ detected by the DPP as presented in Equation (3) is output. In the case of using a RAM type disc, the tracking error signal $TES_{DPP:RAM}$ as presented in Equation (4) is output. Here, the first detecting portion 101 can be disposed to detect the tracking error signal $TES_{DPP:R/RW}$ by the DPP in the case of employing the ±R/RW type disc and the tracking error signal $TES_{DPP:RAM}$ by DPP in the case of employing the RAM type disc.

The second detecting portion 103 comprises first through third subtractors 103a–103c and a single gain adjuster 104. The first subtractor 103a receives detection signals output from the four sections A–D of the main photodetector 81 that receives a zero-order beam and are subjected to current-to-voltage conversion and outputs a signal (A+C)−(B+D).

The second subtractor 103b receives detection signals output from the four sections E1–E4 and the four sections F1–F4 of the second sub photodetector 87 and 89 that receive the plus and minus second-order beams, respectively, and are subjected to current-to-voltage conversion, and outputs a signal (E1+F1+E3+F3)−(E2+F2+E4+F4). The gain of the signal (E1+F1+E3+F3)−(E2+F2+E4+F4) from the second subtractor 103b is adjusted by a predetermined amount k' in the gain adjuster 104.

The third subtractor 103c subtracts the signal output from the first subtractor 103a and the signal subjected to gain adjustment by the gain adjuster 104 from each other and outputs a focus error signal d-FES detected by the DAM.

The controller 105 controls the switch 95 according to the type of the optical disc 30 being adopted in such manner that the tracking error signals $TES_{DPP:RAM}$ and $TES_{DPP:R/RW}$ detected by the DPP are output from the first detecting portion 101 for optical discs, for example, RAM and ±R/RW types, respectively.

Thus, the optical recording and/or reproducing apparatus according to an embodiment of the invention can realize a tracking servo mechanism that is compatible between ±R/RW and RAM type discs.

Table 1 summarizes focus and tracking servo mechanisms that can be implemented by the structure of the photodetecting device 80 comprised of the main photodetector 81 and first and second sub photodetectors 83, 85, 87, and 89 each being divided into a predetermined number of sections as shown in FIG. 7:

TABLE 1

| Servo | Media | Servo Mechanism | |
|---|---|---|---|
| Focus | CD | CD-ROM/R/RW: (A + C) − (B + D) | Astigmatic Method |
| | DVD | DVD-ROM/± R/± RW: (A + C) − (B + D) | Astigmatic Method |
| | | DVD-RAM: | DAM |
| | | (A + C) − (B + D) −K{((E1 + F1) + (E3 + F3)) − ((E2 + F2) + (E4 + F4))} | (Differential Astigmatic Method) |
| Tracking | CD | CD-ROM: (I1 + I2) − (J1 + J2) | 3-Beam Method |
| | | CD-R/RW: MPP − k1 * SPP | DPP |
| | | MPP = (A + B) − (C + D) | (Differential Push-pull Method) |
| | | SPP = (I1 + J1) − (I2 + J2) | |
| | DVD | DVD-ROM: φ (A + C) − φ (B + D) | DPD (Differential Phase Detection) |
| | | DVD ± R/± RW: MPP − k1 * SPP1 | |
| | | DVD-RAM: MPP − k2 * SPP2 | DPP |
| | | MPP = (A + B) − (C + D) | (Differential Push-pull Method) |
| | | SPP1 = (I1 + J1) − (I2 + J2) | |
| RF | CD | RF +, RF − | |
| | DVD | RF +, RF − | |

In Table 1, RF+ and RF− represent RF signal detection techniques.

It is evident from Table 1 that the partitional structure of the photodetecting device 80 as shown in FIG. 7 is used to realize a focus servo by an astigmatic method for optical discs of the CD family, i.e., CD-ROM/R/RW discs. Furthermore, the 3-beam method and the DPP are used to realize a tracking servo for CD-ROM and CD-R/RW, respectively.

While a focus servo can be implemented by an astigmatic method for DVD-ROM/±R/RW discs of the DVD family, it can be realized by the DAM described earlier for a DVD-RAM disc. While a tracking servo can be realized by differential phase detection (DPD) for DVD-ROM, the tracking servo can also be realized by applying a tracking servo realization method according to the invention described above based on the DPP for DVD±R/RW/RAM thus allowing compatibility between the DVD±R/RW/RAM discs.

Thus, because the optical pickup according to the invention and optical recording and/or reproducing apparatus adopting the same include the photodetecting device 80 divided into sections as shown in FIG. 7 are used, it is possible to detect focus error signals FES and tracking error signals TES for various focus and tracking servo operations compatible with CD-ROM/R/RW and DVD-ROM/±RW/RAM.

Thus, an optical recording and/or reproducing apparatus according to the invention can realize focus and tracking servos for DVD-ROM, DVD±R, DVD±RW, and DVD-RAM by, for example, employing a red light source for emitting red light having a wavelength of 650 nm as the single light source 31 and appropriately changing the configuration of the signal processor 100, thus allowing its use for DVD-multi recording.

Furthermore, the optical recording and/or reproducing apparatus according to the invention can realize focus and tracking servos for CD-ROM and CD±RW by appropriately changing the configuration of the signal processor 100 even in the case of using only the light source 31, thus allowing adoption of different formats of CDs as well as DVD-multi recording.

As illustrated in FIG. 2, where the optical pickup according to the invention having the light source 31 and the light splitting device 40 further includes the hologram optical module 70 that emits light having a wavelength different from that emitted by the light source 31, for example, infrared light, to allow compatibility between different formats, for example, CDs and DVDs, it is possible to record and/or reproduce CD-ROM/R/RW as well as DVD-ROM/±RW/RAM.

The hologram optical module 70 is comprised of a light source that emits infrared light suitable for CD, for example, light having a wavelength of 780 nm, a photodetecting device that receives incident light, and a hologram formed in a window region of the hologram optical module 70 for directing a beam incident from the light source 31 and diffracting light reflected by the optical disk 30 and reentering into the hologram optical module 70 into plus and minus first-orders so that the beams can be incident onto the photodetecting device. Furthermore, when use of three beams is considered, the hologram optical module 70 further includes a grating pattern that diffracts the light from the light source 31 into zero-order, plus and minus first-orders, and higher orders onto the window region. The photodetecting device of the hologram optical module 70 is divided into sections as shown in FIG. 1 in order to realize focus and tracking servos as presented in Table 1 above for CD-ROM/R/RW. Since the detailed construction of the hologram optical module 70 is well known in the art, a detailed description thereof will not be given.

Meanwhile, although FIG. 2 has shown the example in which the optical pickup of this invention has two light sources and two photodetecting devices by including the hologram optical module 70, the optical pickup according to this invention may be comprised of two light sources, either of which emits a different wavelength of light suitable for a CD or a DVD and a single photodetecting device. In this case, the optical pickup further includes a light splitting device that splits light from the light source for the CD into three or more beams in order to use three beams for the CD.

Focus error signal and tracking error signal for the CD can be detected by adjusting the distance between the zero-order beam and either of the plus or minus first-order beam split by rotating the light splitting device for the CD and using detection signals from the main photodetector 81 of the photodetecting device 80 according to the invention and either of the first or second pair of sub photodetectors 83 and 85 or 87 and 89.

Meanwhile, for convenience of understanding, sections of the main photodetector 81 and the first sub photodetectors 83 and 85 of the photodetecting device 80 of FIG. 7 according to the invention and detection signals output therefrom are represented by the same reference characters as those of the counterparts of the conventional photodetector 10 of FIG. 1. This is intended to represent focus error and tracking error signals using the same equations since the photodetecting device within the hologram optical module 70 as shown in FIG. 2 also has the same structure as the main photodetector 81 and first sub photodetectors 83 and 85 of the photodetecting device 80, each being divided into a predetermined number of sections.

Thus, equations showing focus and tracking servo mechanisms for the CD in Table 1 above include both when using detection signals from the main photodetector 81 and two sub photodetectors 83 and 85 according to the invention in order to detect focus error and tracking error signals for the CD and when employing photodetector 10 of FIG. 1 as the photodetecting device of the hologram optical module 70.

Meanwhile, it has been described above with reference to FIG. 8 that the signal processor 100 of the optical recording and/or reproducing apparatus according to the invention is constructed to detect the tracking error signal $TES_{DPP:R/RW}$ by DPP for the ±R/RW type disc while detecting the focus error signal d-FES by DAM and tracking error signal $TES_{DPP:RAM}$ by DPP for the RAM type disc. In addition to the construction discussed above, the signal processor 100 further includes a circuit for detecting some of various focus error signals and tracking error signals and a circuit for detecting a reproducing signal, which are not shown. Since the construction of these circuits is well known in the art, a detailed description thereof will not be given.

In the optical recording/reproducing apparatus according to an embodiment of the present invention as configured above, light from the light source 31 is split into a zero-order beam that is a main beam and plus and minus first- and second-order beams that comprise at least four sub beams, which are then emitted on the optical disc 30. The main and sub beams reflected off the optical disc 30 are detected by the main photodetector 81, the first sub photodetectors 83 and 85, and the second sub photodetectors 87 and 89, all of which are divided into a predetermined number of sections in order to detect focus error and tracking error signals in various ways as shown in Table 1.

The signal processor 100 detects a tracking error signal by DPP using the zero-order beam and either plus and minus first- or second-order beams depending on whether the type of optical disc 30 is ±R/RW or RAM. In this case, the controller 105 of the signal processor 100 selects detection signals of any photodetector to use depending on the optical disc type signal and then operates the switch 95 of the photodetecting device circuit 90 according to the selected detection signals generated thereby.

Thus, while a tracking error signal $TES_{DPP:RAM}$ is output from the first detecting portion 101 by the DPP using the zero-order and plus and minus second-order beams in the case of a RAM type disc, a tracking error signal $TES_{DPP:R/RW}$ is output from the first detecting portion 101 by the DPP using zero-order and plus and minus first-order beam in the case of a ±R/RW type disc.

The optical recording and/or reproducing apparatus according to an embodiment of this invention configured in this way can realize a tracking servo that allows compatibility between ±R/RW and RAM type discs having different track pitch dimensions. By employing the partitional structure of the photodetecting device 80 as shown in FIG. 7, the optical pickup according to the invention and the optical recording and/or reproducing apparatus including the same are able to realize a tracking servo using a three-beam method for the CD-ROM, DPP for the CD-R/RW, and DPD for the DVD-ROM, as summarized in Table 1.

Furthermore, the optical pickup according to the invention and optical recording and/or reproducing apparatus including the same are capable of realizing a focus servo using DAM for DVD-RAM, and an astigmatic method for DVD-ROM/±R/RW and CD-ROM/R/RWM, as summarized in Table 1, due to the partitional structure of the photodetecting device 80 as shown in FIG. 7.

Thus, this invention makes it possible to record and/or reproduce both ±R/RW and RAM type discs such as DVD±R/RW, DVD-RAM, and CD-R/RW, and to reproduce CD-ROM and DVD-ROM by appropriately realizing the configurations of the optical system of the optical pickup and signal processor 100.

It is well known in the art that the Combo or CD-RW apparatus reproduces DVD-ROM and DVD±R/RW by realizing focus and tracking servos by an astigmatic method and DPD, respectively, while reproducing DVD-RAM by realizing focus and tracking servos by DAM and DPP, respectively. In this case, it is possible to realize a tracking servo using DPD for DVD±R/RW and to reproduce DVD±R/RW only for the recorded region of a disc which indicated finalization is complete. However, unlike conventional Combo or CD-RW apparatus requiring indication of finalization on DVD±R/RW, this invention is able to realize tracking servo that is compatible between both ±R/RW and RAM type discs without any restraint to optical discs.

While this invention has been described and shown with reference to an embodiment of the photodetecting device circuit 90 including the switch 95, the invention is not limited to this embodiment. In other words, the photodetecting device circuit 90 may not include the switch 95. In this case, the signal processor 100 is constructed to detect a tracking error signal by DPP for ±R/RW and RAM type discs and to further include a switch (not shown) at the output terminal, which is controlled by the controller 105 to output selectively one tracking error signal according to the type of optical disc.

An example of the optical configuration of an optical pickup according to the invention will now be described with reference to FIG. 2.

Referring to FIG. 2, the light source 31 in the optical pickup according to the invention emits light, which is suitable for recording and/or reproducing an optical disc of the DVD family, such as red light with a wavelength at 650 nm. As shown in FIG. 2, the optical system is comprised of a first light path changer 53, e.g., cubic beam splitter, which converts the propagation path of incident light, and an objective lens 61 that collects the main and sub beams split by the light splitting device 40 and focused onto the optical disc 30. The optical system may further include a first collimating lens 55 that collimates the light from the first light path changer 53 so that a parallel beam is incident onto the objective lens 61. The light splitting device 40 is disposed between the light source 31 and the first light path changer 53 for splitting light emitted from the light source 31 into five or more beams.

As described above, the optical pickup according to the invention may further include the hologram optical module 70 for a CD that an optical disc of the CD family is compatible with that of the DVD family. Where the optical pickup further includes the hologram optical module 70, the optical system preferably further includes a second light path changer 75 that converts propagation path of light from the hologram optical module 70 and a second collimating lens 73 that transforms the light emerging from the hologram optical module 70 into a parallel beam.

In FIG. 2, reference numeral 57 denotes a front photodetector that selectively monitors the optical output of the light source 31 and/or the hologram optical module 70, and 63 denotes an adjusting lens disposed between the objective lens 61 and the photodetecting device 80 for adjusting astigmatism of a beam going back to a light receiving portion in order to detect a focus error signal using the principle of astigmatism.

The optical recording and/reproducing apparatus adopting the optical pickup configured as shown in FIG. 2 can optimally realize a tracking servo according to the type of optical disc of the DVD family when recording and/or reproducing optical discs of the DVD family. Supplementarily, it is possible to optimally realize a tracking servo when recording and/or reproducing an optical disc of the CD family The optical pickup according to the invention may be constructed by a hologram optical module including the light source 31, the photodetecting device 80, and the light splitting device 40, and be constructed to separate the hologram optical module 70 from all other components. Furthermore, the partitional structure of the photodetecting device 80 and light splitting device 40 may be employed as the photodetecting device and grating pattern of the hologram optical module 70, respectively.

While this invention has been described and shown with reference to an embodiment of the optical pickup according to the invention designed to realize a compatible tracking servo and optical recording and/or reproducing apparatus including the same, this embodiment should be considered as only exemplary.

For example, the optical pickup according to the invention and optical recording and/or reproducing apparatus may be comprised of one or more light splitting devices 40 that split light from a light source into five beams so that the plus and minus first- and second-order beams radiated on ±R/RW and RAM type discs satisfy the phase difference ranges required by Equations (1) and (2), respectively, one or more photodetecting devices 80 having the partitional structure as shown in FIG. 7, and the signal processor 100 designed to realize at least some of focus and tracking servo mechanisms as shown in Table 1. Various changes in the construction of other components may be made therein.

Various changes in the technical configuration of the photodetecting device circuit and the signal processor of an optical recording/reproducing apparatus according to the invention may be made therein without departing from the spirit and scope of the present invention.

In the optical pickup according to the invention and optical recording and/or reproducing apparatus including the same according to the invention, various changes in the configuration of the optical system of the optical pickup and signal processor 100 may be made in such a way as to record and/or reproduce both ±R/RW and RAM type discs such as DVD±R/RW, DVD-RAM, and CD-R/RW, and to reproduce CD-ROM and DVD-ROM.

As described above, this invention makes it possible to realize a tracking servo that is compatible between ±R/RW and RAM type optical data storage media having different track pitch dimensions based on the DPP.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup comprising:
at least one light source;
at least one light splitting device which splits light from the light source into a main beam and four or more sub beams symmetrical with respect to the main beam, which are then emitted on an optical data storage medium, wherein the four or more sub beams include two first sub beams located close to the main beam and two second sub beams located away from the main beam; and
at least one photodetecting device, which receives the main and sub beams reflected off the optical data storage medium;
wherein where phase differences between the two first sub beams and between the two second sub beams are PH1 and PH2, respectively, the first and second sub beams are emitted on the optical data storage medium so that PH1 and/or PH2 satisfy Equations (1) and/or (2) given below, respectively, and a tracking error signal is detectable by a differential push-pull (DPP) method using the main beam and the two first sub beams and the main beam and the two second sub beams for ±R/RW and RAM type optical data storage media, respectively:

$$181.5° \leq PH1 \leq 211.5° \quad (1)$$

$$148.3° \leq PH2 \leq 181.7° \quad (2).$$

2. The optical pickup of claim 1, wherein the photodetecting device comprises a main photodetector receiving the main beam, a pair of first sub photodetectors receiving the first sub beams, and a pair of second sub photodetectors receiving the second sub beams.

3. The optical pickup of claim 2, wherein each of the first and second sub photodetectors is divided into two or more sections.

4. The optical pickup of claim 3, wherein the main photodetector is divided into four or more sections.

5. The optical pickup of claim 4, wherein either second sub photodetector is divided into four or more sections.

6. The optical pickup of claim 1, wherein the light splitting device is a diffractive optical element that diffracts the light from the light source into a plurality of beams including a zero-order beam and plus and minus first- and second-order beams, and the main beam, the two first sub beams, and the two second sub beams are the zero-order beam, the plus and minus first-order beams, and the plus and minus second-order beams, respectively.

7. The optical pickup of claim 1, wherein beams having a plurality of different wavelengths are used to record on and/or reproduce from a plurality of different types of optical data storage media that are compatible with one another.

8. The optical pickup of claim 7, wherein recording and/or reproduction is made on and/or from at least some of CD-ROM/R/RW and at least some of DVD-ROM/±R/RW/RAM that are compatible with one another.

9. The optical pickup of claim 1, wherein at least some of DVD-ROM/±R/RW/RAM and/or at least some of CD-ROM/R/RW are recorded on and/or reproduced from.

10. The optical pickup of claim 1, wherein the RAM type optical data storage medium is a DVD-RAM optical data storage medium, and the ±R/RW type optical data storage medium is a DVD±R/RW optical data storage medium and/or a CD-R/RW optical data storage medium.

11. An optical recording and/or reproducing apparatus, comprising:

an optical pickup comprising at least one light splitting device, which splits light from at least one light source into a main beam and four or more sub beams symmetrical with respect to the main beam, which are then emitted on an optical data storage medium, wherein the four or more sub beams include two first sub beams located close to the main beam and second two sub beams located away from the main beam, at least one photodetecting device, which receives the main and the first and second sub beams reflected off the optical data storage medium, wherein where phase differences between the two first sub beams and between the two second sub beams are PH1 and/or PH2, respectively, the first and second sub beams are emitted on the optical data storage medium so that PH1 and PH2 satisfy Equations (1) and/or (2) given below, respectively, and a tracking error signal is detectable by a differential push-pull (DPP) method using the main beam and the two first sub beams and the main beam and the two second sub beams for ±R/RW and RAM type optical data storage media, respectively:

$$181.5° \leq PH1 \leq 211.5° \quad (1)$$

$$148.3° \leq PH2 \leq 181.7° \quad (2); \text{ and}$$

a signal processor designed to detect a tracking error signal by the differential push-pull (DPP) using detection signals of the main and the two first sub beams and the two of the main and second sub beams for ±R/RW and RAM type optical data storage media, respectively.

12. The optical recording and/or reproducing apparatus of claim 11, wherein the photodetecting device comprises a main photodetector receiving the main beam, a pair of first sub photodetectors receiving the first sub beams, and a pair of second sub photodetectors receiving the second sub beams.

13. The optical recording and/or reproducing apparatus of claim 12, wherein each of the first and second sub photodetectors is divided into two or more sections.

14. The optical recording and/or reproducing apparatus of claim 13, wherein the main photodetector is divided into four or more sections.

15. The optical recording and/or reproducing apparatus of claim 14, wherein either second sub photodetector is divided into four or more sections.

16. The optical recording and/or reproducing apparatus of claim 15, wherein the signal processor detects a focus error signal by a differential astigmatic method using detection signals from the main and the two second sub photodetectors for a RAM type optical data storage medium.

17. The optical recording and/or reproducing apparatus of claim 11, wherein the light splitting device is a diffractive optical element that diffracts the light from the light source into a plurality of beams including a zero-order beam and plus and minus first- and second-order beams, and the main beam, the two first sub beams, and the second sub beams are the zero-order beam, the plus and minus first-order beams, and the plus and minus second-order beams, respectively.

18. The optical recording and/or reproducing apparatus of claim 11, wherein the optical pickup uses beams having a plurality of different wavelengths to record on and/or reproduce from a plurality of different types of optical data storage media that are compatible with one another.

19. The optical recording and/or reproducing apparatus of claim 18, wherein recording and/or reproduction is made on and/or from at least some of CD-ROM/R/RW and at least some of DVD-ROM/±R/RW/RAM that are compatible with one another.

20. The optical recording and/or reproducing apparatus of claim 11, wherein at least some of DVD-ROM/±R/RW/ RAM and/or at least some of CD-ROM/R/RW are recorded on and/or reproduced from.

21. The optical recording and/or reproducing apparatus of claim 11, wherein the RAM type optical data storage medium is a DVD-RAM optical data storage medium, and the ±R/RW type optical data storage medium is a DVD±R/RW optical data storage medium and/or a CD-R/RW optical data storage medium.

22. A method of realizing a tracking servo that is compatible between different types of optical data storage media, the method comprising:

splitting light from a light source into a main beam and four or more sub beams symmetrical with respect to the main beam, wherein the four or more sub beams include two first sub beams located close to the main beam and two second sub beams located away from the main beam, and where phase differences between the first sub beams and/or between the second sub beams are PH1 and/or PH2, respectively, emitting the first and second sub beams on an optical data storage medium in such a manner that PH1 and/or PH2 satisfy Equations (1) and/or (2) given below, respectively:

$$181.5° \leq PH1 \leq 211.52° \quad (1)$$

$$148.3° \leq PH2 \leq 181.7° \quad (2);$$

detecting the main and sub beams reflected off the optical data storage medium to result in detection signals; and detecting a tracking error signal by differential push-pull (DPP) using the detection signals resulting from the main and first sub beams and from the main and second sub beams for ±R/RW and RAM type optical data storage media, respectively.

23. The method of claim 22, wherein the detection of the tracking error signal comprises:

determining whether detection signals of the main and the first sub beams or the main and the second sub beams will be used for detecting the tracking error signal according to an optical data storage medium type signal detected by an optical recording and/or reproducing apparatus; and detecting the tracking error signal suitable for the type of optical data storage medium by DPP and outputting the same.

24. The method of claim 22, wherein the main beam, the two first sub beams, and the two second sub beams are a zero-order beam, plus and minus first-order beams, and the plus and minus second-order beams, respectively, all of which are split by a diffractive optical element.

25. The method of claim 22, wherein the RAM type optical data storage medium is DVD-RAM optical data storage medium, and the ±R/RW type optical data storage medium is DVD±R/RW and/or CD-R/RW optical data storage medium.

26. A compatible optical pickup reading from an optical disc, comprising:

a light source emitting light;

a light splitter which splits the light into a main beam and four sub beams;

an optical path changing means for changing the path of the main beam and the four sub beams to and from the optical disc;

a photodetector detecting the reflection signals from the main beam and each of the four sub beams, the photodetector comprises a main photodetector detecting a main detection signal from the main beam reflected by the optical disc;

a first and second sub photodector detecting a first pair of the four sub beams closest to the main beam reflected by the optical disc; and a third and fourth sub photodetector detecting a second pair of the four sub beams furthest from the main beam reflected by the optical disc, wherein a tracking error signal is detectable based on the reflection signals of the main beam and each of the four sub beams based on a type of the optical disc and a phase between the first pair of the four sub beams and between the second pair of the four sub beams is adjustable by rotating the light splitter.

27. The pickup of claim 26, wherein the main beam corresponds to a zero order beam, the first pair corresponds to a plus and minus first order beam, respectively, and the second pair corresponds to a plus and minus second order beam, respectively.

28. The pickup of claim 27, wherein the phase between the plus and minus first order beams and the phase between the plus and minus second order beams is adjusted so that:

$$181.5° \leq PH1 \leq 211.5°$$

$$148.3° \leq PH2 \leq 181.7°$$

where PH1 is the phase between the plus and minus first order beams, and PH2 is the phase between the plus and minus second order beams.

29. The pickup of claim 27, wherein the main photodetector comprises four divided regions, the first photodetector and the second photodetector each comprises two divided regions, and the third photodetector and the fourth photodetector each comprises four divided regions, wherein the first and third photodetectors and the second and fourth photodetectors are respectively disposed at opposite sides of the main photodetector.

30. The pickup of claim 29, further comprising:

a switching circuit selectively connecting the first, second, third and fourth photodetectors to a signal processor which detects the tracking error signal by a differential push-pull (DPP) method.

31. The pickup of claim 30, wherein the phase between the first pair of the four sub beams and the phase between the second pair of the four sub beams is set so that:

$$181.5° \leq PH1 \leq 211.5°$$

$$148.3° \leq PH2 \leq 181.7°$$

where PH1 is the phase between the first pair of the four sub beams, and PH2 is the phase between the second pair of the four sub beams.

32. The pickup of claim 31, wherein when the type of the optical disc is ±R/RW, the controller causes the switching circuit to connect the first and second photodetectors to the signal processor.

33. The pickup of claim 31, wherein when the type of the optical disc is RAM, the controller causes the switching circuit to connect the third and fourth photodetectors to the signal processor.

* * * * *

UNITED STATES PATENT AND TRADEMARK OFFICE
CERTIFICATE OF CORRECTION

| | | |
|---|---|---|
| PATENT NO. | : 7,206,266 B2 | Page 1 of 1 |
| APPLICATION NO. | : 10/822868 | |
| DATED | : April 17, 2007 | |
| INVENTOR(S) | : Pyong-yong Seong | |

It is certified that error appears in the above-identified patent and that said Letters Patent is hereby corrected as shown below:

Column 18, Line 34, change "$181.5° \leq PH1 \leq 211.52°$" to --$181.5° \leq PH1 \leq 211.5°$--.

Signed and Sealed this

Seventh Day of August, 2007

JON W. DUDAS
*Director of the United States Patent and Trademark Office*